(12) United States Patent
Sakama et al.

(10) Patent No.: US 7,250,867 B2
(45) Date of Patent: Jul. 31, 2007

(54) WIRELESS IC TAG, AND METHOD AND APPARATUS FOR MANUFACTURING THE SAME

(75) Inventors: Isao Sakama, Hiratsuka (JP); Minoru Ashizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 11/019,364

(22) Filed: Dec. 23, 2004

(65) Prior Publication Data
US 2005/0140512 A1   Jun. 30, 2005

(30) Foreign Application Priority Data
Dec. 25, 2003   (JP) .............................. 2003-431025
Jul. 29, 2004   (JP) .............................. 2004-221926

(51) Int. Cl.
*G08B 13/14*   (2006.01)
(52) U.S. Cl. ................. 340/572.7; 340/572.8; 235/492
(58) Field of Classification Search ............. 340/572.7, 340/572.8, 10.1, 572.1; 235/492, 462.43, 235/462.46, 439
See application file for complete search history.

(56) References Cited

U.S. PATENT DOCUMENTS

| | | | |
|---|---|---|---|
| 5,797,084 A | * | 8/1998 | Tsuru et al. .................. 455/73 |
| 6,104,311 A | * | 8/2000 | Lastinger ................. 340/10.51 |
| 6,181,287 B1 | | 1/2001 | Beigel ........................ 343/741 |
| 6,371,380 B1 | * | 4/2002 | Tanimura .................... 235/492 |
| 6,424,315 B1 | * | 7/2002 | Glenn et al. ................ 343/895 |
| 6,480,699 B1 | * | 11/2002 | Lovoi ........................ 455/41.2 |
| 6,486,783 B1 | | 11/2002 | Hausladen et al. ...... 340/572.8 |

FOREIGN PATENT DOCUMENTS

| | | |
|---|---|---|
| GB | 2197565 | 5/1988 |
| JP | 11-339142 | 12/1999 |
| JP | 11-352243 | 12/1999 |
| JP | 2003-203527 | 7/2003 |
| JP | 2003-234673 | 8/2003 |
| WO | 03/107292 | 12/2003 |

* cited by examiner

*Primary Examiner*—Toan N. Pham
(74) *Attorney, Agent, or Firm*—Mattingly, Stanger Malur & Brundidge, P.C.

(57) ABSTRACT

In a wireless IC tag, metallic antennas are deposited as thin films on the front and back surfaces of a spacer, made of a heat-resistant glass epoxy material having a desired dielectric constant, to form a first antenna and a second antenna. An IC chip is mounted in the center of the first antenna. The second antenna functions as an auxiliary antenna for resonating to a desired frequency of a transmission radio wave of the first antenna to strengthen the intensity of the radio wave. Accordingly, even when the IC tag is mounted to a cable or the like, the tag can be mounted in the interior of the enclosure of the cable and thus the radio wave intensity of the first antenna can be prevented from being weakened by a metallic member in the cable.

21 Claims, 10 Drawing Sheets

WIRELESS IC TAG, AND METHOD AND APPARATUS FOR MANUFACTURING THE SAME

The present application claims priority from Japanese applications JP 2004-221926 filed on Jul. 29, 2004, JP 2003-431025 filed on Dec. 25, 2003, the contents of which are hereby incorporated by reference into this application.

BACKGROUND OF THE INVENTION

The present invention relates to wireless IC tags suitable for mounting on a member having a large dielectric constant, and methods and apparatuses for manufacturing the wireless IC tags. In particular, the present invention relates to a wireless IC tag suitable for mounting on a power cable, a communication cable or the like, and a method and apparatus for manufacturing the wireless IC tag.

For the purpose of article management, theft or fraud prevention; a wireless tag for obtaining information on an article in a non-contact manner has been developed and put to practical use. For example, JP-A-11-339142 discloses a tag which has a resonance circuit including a conductor functioning as an antenna and an insulating substrate sheet as a spacer, in place of a prior art wireless tag used for the purpose of theft prevention. A radio wave having a predetermined frequency is transmitted to the aforementioned wireless tag (referred to as "tag for preventing theft" in the JP-A-11-339142), and a tag for receiving and detecting the radio wave is used to monitor the article having the tag attached thereto for theft prevention. The wireless tag has a feature of high sensitivity. In other words, the wireless tag can be detected over a long distance.

Also disclosed in JP-A-2003-203527 is a technique for reading cable information including the manufacturer name, manufactured date, specifications, length, etc. of a cable such as a power cable or a communication cable, on the surface or in the outer layer of which a wireless IC tag is mounted. According to this technique, since the wireless IC tag is mounted at intervals of a predetermined length on the cable, cable information can be read not only at the terminal of the buried cable but also at any given position thereon.

SUMMARY OF THE INVENTION

The aforementioned wireless tag, however, has a problem that, when the wireless tag is bonded to a metallic article, a radio wave received by the wireless tag is absorbed in the metallic article. Thus, the intensity of radio wave to be transmitted from the wireless tag becomes weak and thus its detectable distance becomes short.

This problem similarly arises even in a wireless IC tag having an IC chip added thereto. The wireless IC tag has a base material, an antenna as a metallic foil formed on the base material, an IC chip provided on the antenna and having information previously written therein, and a spacer disposed between the base material and the article. A radio wave having a predetermined frequency is transmitted from an external antenna to the wireless IC tag. The tag produces an operating power from the radio wave received from the external antenna to operate the IC chip, reads out the information previously written in the IC chip, and transmits the information from the antenna of the IC chip. The information is received by the external antenna. When the wireless IC tag that is used is bonded to the metallic article or the like, the radio wave received by the wireless IC tag is absorbed in the metallic article. Thus, the tag cannot obtain a sufficient operating power. This eventually results in the tag not being able to operate the IC chip to read the information, nor transmit the information a sufficiently far enough distance.

In order to solve the problem, the spacer is required to be made thick. Since the thick spacer leads to an increase in the size of the wireless IC tag (an increase in the thickness in this example), this method cannot be easily employed.

Figure 6:
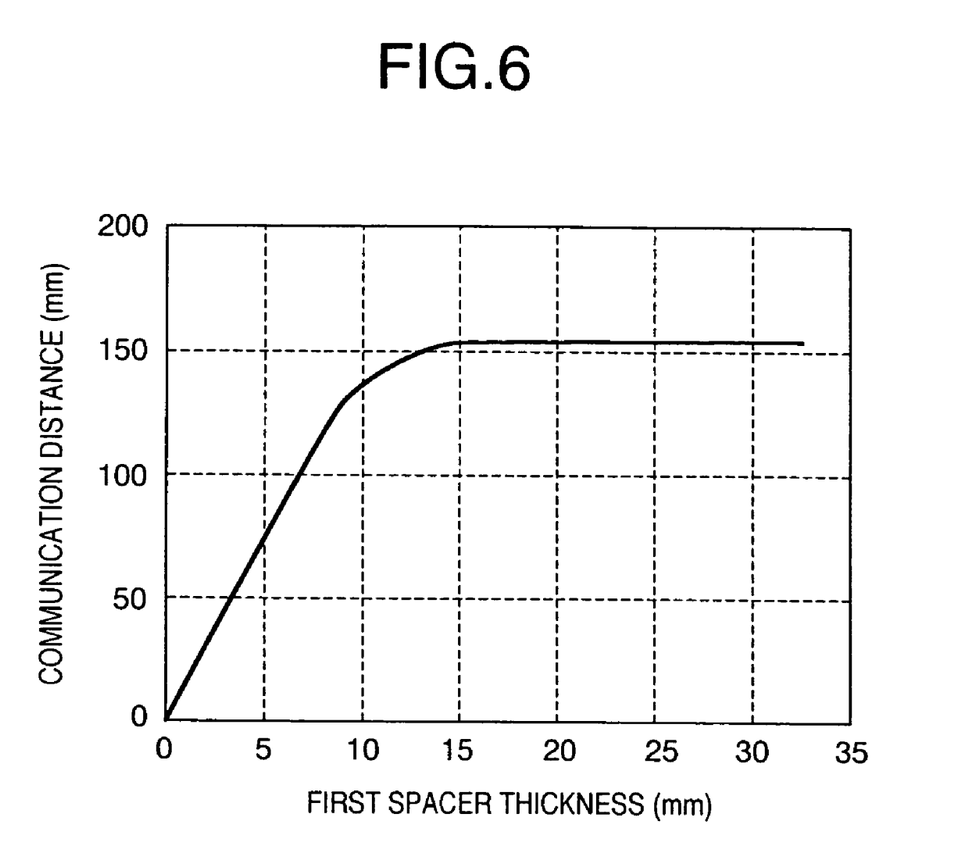
FIG. 6 is a graph showing a communication distance characteristic with respect to the thickness of a first spacer in a prior art wireless IC tag.

FIG. 6 is a graph showing a communication distance characteristic when the thickness of the spacer in the aforementioned prior art wireless IC tag is varied. When the spacer thickness is 1 mm, a communication distance is as short as about 10 mm. On the contrary, in order to make the communication distance longest (about 150 mm), a spacer is required to have a thickness not smaller than 15 mm. In this example, the antenna is assumed to have a length of 53 mm.

When the spacer thickness is increased in this manner, the communication distance can be increased. However, when the spacer thickness is increased to obtain a long communication distance, involves a large-sized wireless IC tag results. As a result, its application field is limited, thus being a hindrance. Even when such a large tag is actually used, the tag may be possibly peeled off due to contact with the person or object that it contacts, thereby reducing durability.

Even when such a tag is mounted to a cable, the communication distance of the tag is remarkably reduced, because the interior of the cable may be a metallic conductor such as copper or a metallic shield layer may be applied to the inside of an outer layer thereof. Further, when the wireless IC tag is bonded and mounted onto the surface of the cable, the tag may be easily dismounted. In addition, when the wireless IC tag is buried in the interior of the cable, the substrate of the tag cannot withstand the high temperature encountered when the cable is molded. In this way, the durability of the wireless IC tag is still a problem.

The present invention solves this problem. It is an object of the present invention to provide a wireless IC tag which can have a small thickness and a long communication distance even when mounted in the vicinity of a metallic part and which is less likely to be dismounted or destroyed by a high temperature even when mounted to a cable or the like, and also to provide a method and apparatus for manufacturing the wireless IC tag.

In order to solve the aforementioned problem, a wireless IC tag in accordance with the present invention includes a first antenna and a first spacer. The tag produces an operating power from a radio wave having a predetermined frequency and received at the first antenna to operate an IC chip, and reads out and transmits identification information stored in the chip. The tag also includes a second antenna having a predetermined length and having an auxiliary function of resonating to a radio wave having a predetermined frequency and strengthening an radio wave to be transmitted from the first antenna, and a second spacer disposed between the first and second antennas for maintaining a distance between both antennas.

In the present invention, further, a heat resistant substrate made of glass epoxy, ceramic or fluorine resin is used as the second spacer to withstand a high temperature when a cable is molded. In order to secure a desired communication distance even when a metallic conductor or a shield layer is present in the interior of the cable, the first and second antennas are made in the form of thin films by metallic deposition on both sides of the second spacer, and an auxiliary function of strengthening the radio wave to be transmitted from the first antenna is provided to the second antenna.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will be explained in detail with reference to accompanying drawings.

Embodiment 1

Figure 1:
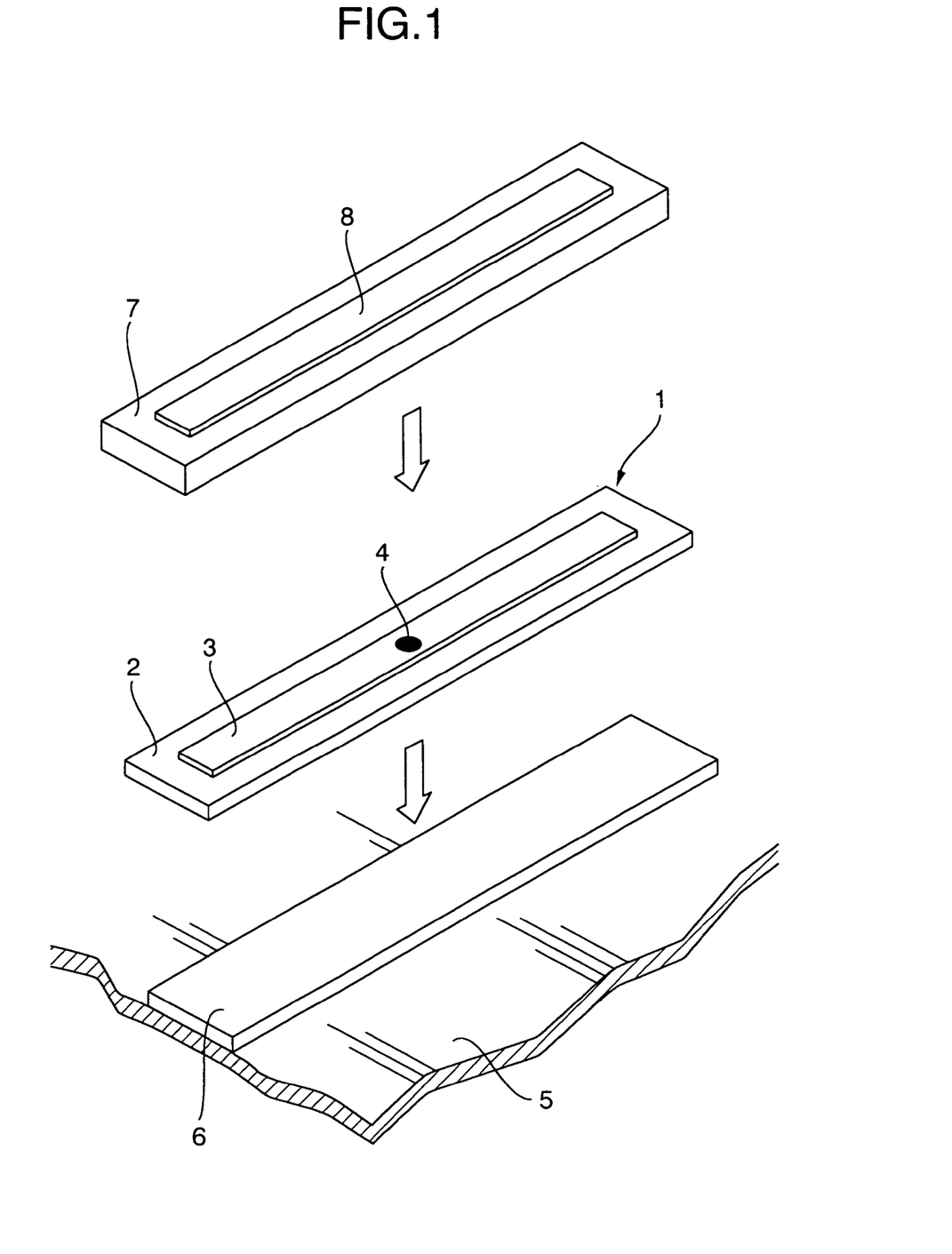
FIG. 1 is a perspective view showing a structure of a wireless IC tag in accordance with an embodiment 1.
Figure 2A:
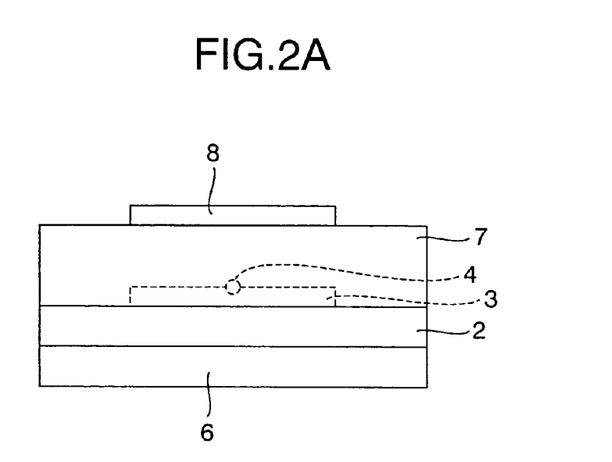
FIG. 2A is a cross-sectional view of the wireless IC tag of embodiment 1 when taken in its width direction.
Figure 2B:
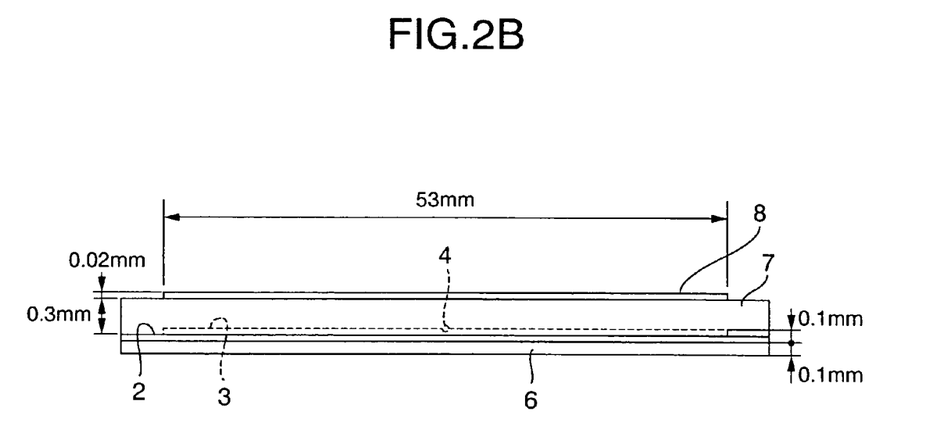
FIG. 2B is a cross-sectional view of the wireless IC tag of embodiment 1 when taken in its length direction.

FIG. 1 shows a structure of a wireless IC tag in accordance with a first embodiment (embodiment 1). FIG. 2B is a cross-sectional view of the wireless IC tag of FIG. 1 when taken in its width direction, and FIG. 2A is a cross-sectional view of the wireless IC tag of FIG. 1 when taken in its length direction. Among members of the wireless IC tag shown in FIG. 1; a base material 2, an antenna (first antenna) 3, and an IC chip 4 form a plate shape, and are collectively called "inlet 1". Reference numeral 5 denotes a member on which the wireless IC tag is mounted. The wireless IC tag according to embodiment 1 includes the inlet 1 having the first antenna 3 mounted on the base material 2 to be connected to the IC chip 4 having ID information stored therein, a first spacer 6 mounted on a lower surface of the inlet 1 (e.g., on the side of the inlet opposed to the metallic member 5), a second spacer 7 mounted on an upper side of the inlet 1 (on the side of the inlet opposed to the metallic member 5), and a second antenna 8 mounted on the second spacer 7 for acting as a resonator.

The inlet 1 itself has a structure wherein, for example, the first antenna 3 of a copper foil, which is plated with tin as well as the IC chip 4 having an ID code of 128 bits previously written therein, are arranged on the base material 2 made of polyimide resin. The thickness of the first spacer 6 located on the lower surface of the inlet 1 is set at 0.1 mm in the example of FIG. 2B, and the material of the first spacer is a foam material having a dielectric constant close to 1. More specifically, the material of the first spacer material is suitably selected from urethane-based, acryl-based or synthetic rubber-based material, considering cost, durability, and adhesivity. No restriction is specifically imposed on the dimensions of the first spacer 6 in its width and length directions.

The inlet 1 itself is already known. More specifically, for example, 10,000 of the first antennas 3 connected to the respective IC chips 4 are arranged in their width direction in the form of rectangular strips on a plate-shaped base material (meaning a plate material before being cut into the base materials 2 having the width dimension, one of which is shown in FIG. 1), and then wound into a roll to form a package (which is generally called TCP (tape carrier package) inlet). Alternatively, a sheet-like inlet is already known as an inlet material.

The material of the second spacer 7 mounted on the upper surface of the inlet 1 is an insulating material such as a foam material or a rubber having a dielectric constant close to 1, including a urethane based, acryl-based or synthetic rubber-based material. In the example of FIG. 2B, the thickness of the second spacer 7 is set at 0.3 mm. However, no restriction is specifically imposed even on the width or length dimensions of the second spacer 7, and thus such dimensions may be determined from the viewpoint of ease of manufacturing.

The second antenna 8 mounted on the second spacer 7 is formed as a copper foil similarly to the first antenna 3. However, the second antenna 8 is not specifically restricted to the example, but may be formed as an aluminum foil, a conductive ink (a mixture of ink in which carbon resin is incorporated in ink), or the like. The thickness of the second antenna is set, for example, at about 0.02 mm and the length thereof is set at 53 mm for a reason which will be explained later. The width dimension of the second antenna 8 is not specifically limited.

Figure 3:
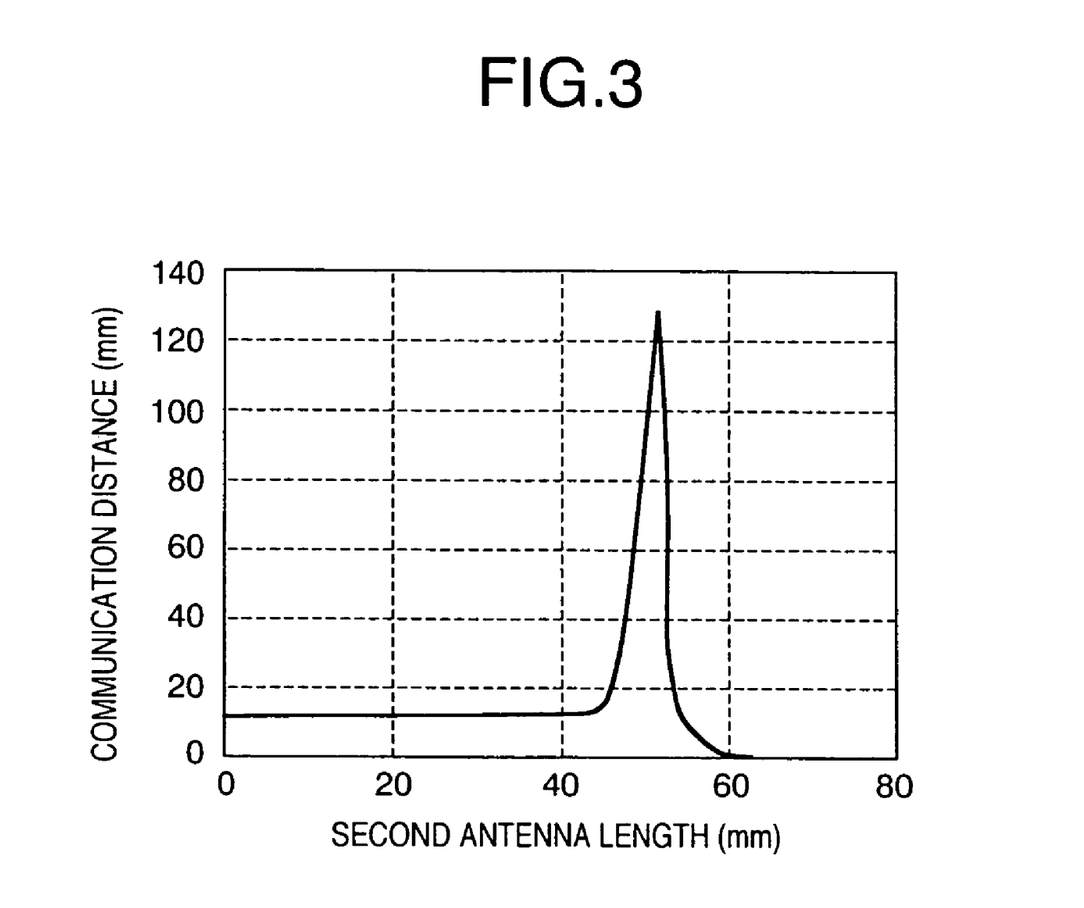
FIG. 3 is a graph showing a communication distance characteristic with respect to the length of a second antenna of the wireless IC tag of embodiment 1.

FIG. 3 is a graph showing a experimental result of a measured communication distance with respect to the length of the second antenna 8 when the insulating material of the second spacer 7 has a constant dielectric constant. As shown in FIG. 3, the communication distance is as constant as about 12 mm for a length of the second antenna 8 of about 45 mm or less. However, as the length of the second antenna 8 is increased, the communication distance becomes abruptly long for lengths of the second antenna exceeding 45 mm.

When the second antenna length is 53 mm, the communication distance becomes about 130 mm. As the length of the second antenna 8 is further increased, the communication distance contrarily becomes abruptly short. And when the length of the second antenna reaches about 60 mm, no communication state (communication distance of zero) is established. In embodiment 1, on the basis of this experimental result, the length of the second antenna 8 is set at 53 mm where the communication distance becomes longest.

In order to make the communication distance long, the insulating material of the second spacer 7 having a small dielectric constant is advantageous. Further, the insulating material of the first spacer 6 and the insulating material of the second spacer 7 may be the same or different from each other. However, it is known that the insulating material of the second spacer 7 exerts more influence upon the communication distance than the insulating material of the first spacer 6. For example, when the first spacer 6 is made of a foam material having a dielectric constant close to air and when the second spacer 7 is made of rubber, the communication distance becomes short because the material of the second spacer 7 has a large dielectric constant.

It is theoretically known that, when the length of the second antenna 8 is set at ½ of the wavelength of a radio wave having a predetermined frequency (2.45 GHz) to read out information from the wireless IC tag, the communication distance becomes longest. However, the second antenna length varies with the dielectric constant, etc. of the second spacer 7. When the second spacer 7 is made of an insulating material having a large dielectric constant, the length of the second antenna 8 can be short. For example, it is known that, when chloroprene rubber is employed as the insulating material of the second spacer 7, the length of the second antenna 8 can be shortened from 53 mm in the above case to 45 mm, though its experimental result is not shown.

In this way, the communication distance and the length of the second antenna 8 have a tradeoff relation with respect to the dielectric constant of the employed insulating material of the second spacer 7. For this reason, when an insulating material having a suitable dielectric constant is selected, it is possible to realize a wireless IC tag which can make its size small due to addition of the second spacer 7 and the second antenna 8, which can shorten its length dimension due to a shortened antenna length, and which can secure a relatively long communication distance. In the aforementioned example, since the length of the first antenna 3 can have the same length as the second antenna 8, that is, be made to be 45 mm; the wireless IC tag can be made thin, shorten its length dimension, and be made small in size. Table 1 shows an example of the wireless IC tag when the thicknesses of the first and second spacers 6 and 7 are varied. In this case, the inlet 1 has the same thickness as the second antenna 8.

TABLE 1

|  | Example 1 | Example 2 | Example 3 |
|---|---|---|---|
| Second antenna thickness | About 0.02 | About 0.02 | About 0.02 |
| Second spacer thickness | 0.3 | 0.6 | 0.6 |
| Inlet (TCP) thickness | About 0.1 | About 0.1 | About 0.1 |
| First spacer thickness | 0.1 | 0.4 | 1.0 |

TABLE 1-continued

|  | Example 1 | Example 2 | Example 3 |
|---|---|---|---|
| Entire wireless IC tag thickness | About 0.5 | About 1.1 | About 1.7 |

Unit: mm

As shown in Table 1, when a structure of Example 1 is employed, the wireless IC tag can be made thinnest. For example, when the thickness of the wireless IC tag is important, such a wireless IC tag as shown in Example 1 can be used. When Example 1 is compared with Examples 2 and 3, however, the length of the second antenna 8 is required to have such an accuracy as to be adjusted to a prescribed length depending on a material of the first spacer 6. If the accuracy requirement is not satisfied, then the wireless IC tag varies in communication distance. Example 1 corresponds to the wireless IC tag according to the embodiment 1 shown in FIG. 2B.

In the case of a wireless IC tag of Example 2, the tag is thicker than the wireless IC tag of Example 1. However, the length of the second antenna 8 is not required to have an accuracy as high as Example 1 to be adjusted to the prescribed length. And even when the accuracy requirement is not satisfied, the wireless IC tag can secure a communication distance in a more stable fashion than in the wireless IC tag of Example 1. For example, this tag can be used when having a thin-dimension is not as important and when it is desired to reduce its manufacturing cost by decreasing the number of adjusting steps.

As shown even in Examples 1, 2 and 3, for the purpose of increasing the communication distance, it is desirable to make the second spacer 7 thicker than the first spacer 6.

A wireless IC tag of Example 3 is thicker than the wireless IC tag of Example 2. However, as will be seen from FIG. 6, the communication distance can be made long by increasing the thickness of the first spacer 6. Thus the tag of Example 3 can be used depending on its application.

Explanation will next be made as to the operation of a system using the wireless IC tag (sometimes by referring to FIG. 1).

Figure 4:
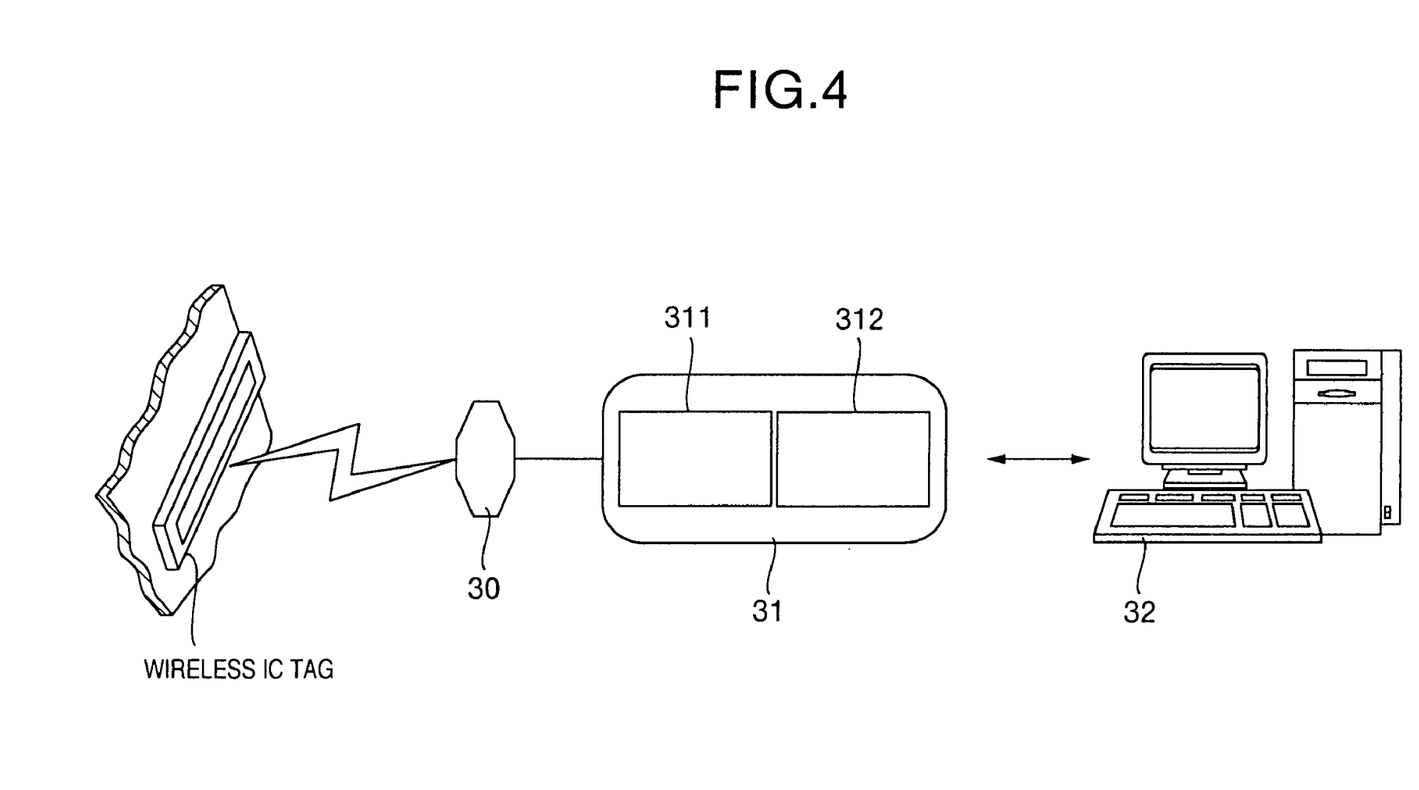
FIG. 4 is an arrangement of an IC tag system including the wireless IC tag of embodiment 1, a reader for transmitting a radio wave having a predetermined frequency to the wireless IC tag, an external antenna, and a host computer.

FIG. 4 shows an arrangement of an IC tag system. The IC tag system includes a wireless IC tag, an external antenna 30 for transmitting and receiving a radio wave having a predetermined frequency to and from the wireless IC tag, a reader 31 for controlling the transmission and reception of the radio wave at the external antenna 30, and a host computer 32 for instructing the reader 31 to read an ID code stored in the wireless IC tag. An RF (radio frequency) transmitter/receiver 311 in the reader 31 outputs/inputs and modulates/demodulates a signal to be transmitted/received; while a controller 312 therein performs communication with the host computer 32 and performs signal transfer to and from the RF transmitter/receiver 311.

Explanation will be made in connection with an example when the ID code stored in the wireless IC tag mounted on the metallic member 5 is read out. When the controller 312 in the reader 31 receives an instruction from the host computer 32 to read the ID code stored in the wireless IC tag, the controller controls the RF transmitter/receiver 311 to transmit a radio wave having a predetermined frequency (2.45 GHz) from the external antenna 30 to the wireless IC tag. The second antenna 8 on the side of the wireless IC tag when receiving the radio wave resonates to the first antenna 3 when receiving the wave similarly. As a result, the wireless IC tag produces an operating power larger than the prior art, operates the IC chip 4 with the operating power, reads out the previously-written ID code from the chip, and then transmits the code to the external antenna 30. The reader 31 receives the ID code from the wireless IC tag via the external antenna 30; and the controller 312 receives the received ID code from the RF transmitter/receiver 311 and transmits it to the host computer 32. The host computer 32 receives and uses the ID code, for example, as information about the member 5 having the wireless IC tag mounted thereon.

The communication distance of the prior art wireless IC tag is merely 10 mm, whereas the communication distance of the wireless IC tag of the embodiment 1 can be made to be 130 mm as mentioned above. Thus, a distance between the wireless IC tag and the external antenna 30 in FIG. 4 can be made to be 130 mm. As a result, although an specific external antenna (enabling a short communication distance) suitable for such a member having a large dielectric constant as the metallic member 5 has been required to be used as the external antenna 30 in the prior art, the present invention can use a general external antenna commonly used because the communication distance can be made long as mentioned above.

In this connection, the member 5, on which the wireless IC tag of embodiment 1 can be suitably mounted, may be made of not only the metallic material as mentioned above but also a glass member containing water or a material such as an animal's body, which contains much water and has a large dielectric constant, as an example.

In embodiment 1, the communication distance for the predetermined frequency was made about 13 times longer than the communication distance of the prior art wireless IC tag, while reducing the overall thickness of the wireless IC tag. When the first and second spacers 6 and 7 are made of an insulating material and the thickness of the second spacer 7 is made larger than that of the first spacer 6, a more effective wireless IC tag can be realized by increasing the communication distance. In this connection, for the purpose of joining the antennas and the spacers in the wireless IC tag, an adhesive can be employed.

Embodiment 2

Figure 5:
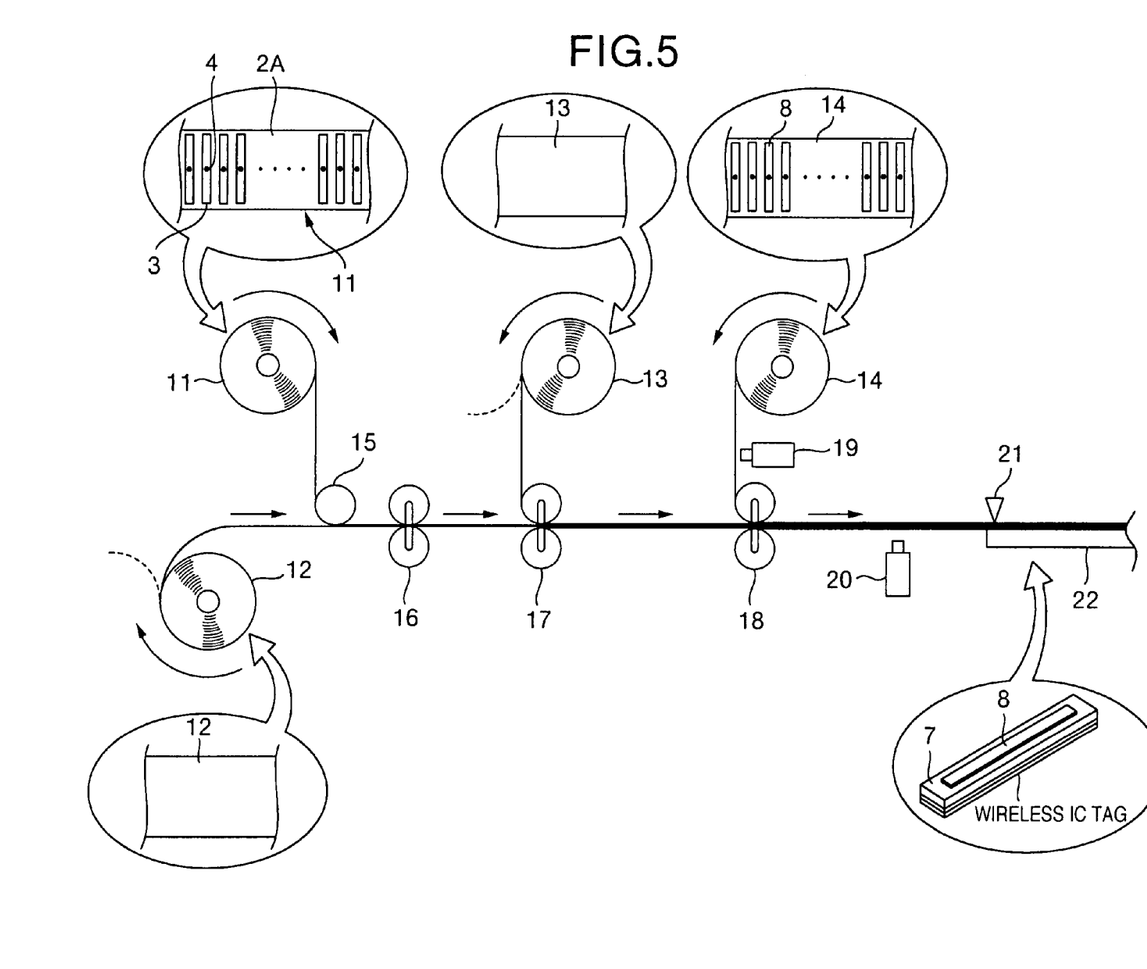
FIG. 5 is a structure of an apparatus for manufacturing a wireless IC tag in accordance with an embodiment 2.

FIG. 5 schematically shows a structure of an apparatus for manufacturing such a wireless IC tag (as having the structure shown in FIG. 1). Constituent elements having the same functions or structures as in FIG. 1 are denoted by the same reference numerals. In FIG. 5, diagrams shown as surrounded by respective circles in the vicinity of an inlet material 11, a first spacer material 12, a second spacer material 13 and a second antenna material 14, to be explained later, are views of the respective materials when viewed from their planes. A diagram shown as surrounded by a circle in the lower right side of FIG. 5 is a perspective view of the wireless IC tag (having a structure similar to that of FIG. 1) manufactured by the wireless IC tag manufacturing apparatus.

In FIG. 5, reference numeral 11 denotes the first antenna material (more specifically, the inlet material). As already explained earlier, it is already known that, for example, 10,000 of the first antennas 3 connected with the IC chips 4 in FIG. 1 are arranged in their width direction in the form of rectangular strips on a plate-shaped base material 2A, and then wound to form a TCP inlet. Such an inlet can be used as it is. Numeral 12 denotes the first spacer material as a foam material (meaning a plate material before cut into strips of the width dimension of the first spacer 6 in FIG. 1). For example, a double-coated tape is applied onto one surface of the first spacer material 12 as an adhesive surface, under which condition the first spacer material is wound into a roll. Numeral 13 denotes the second spacer material as a foam material (meaning a plate material before cut into strips of the width dimension of the second spacer 7 in FIG. 1). For example, a double-coated tape is applied to both sides of the second spacer material, under which condition the second spacer material is wound into a roll. Numeral 14 denotes the second antenna material on which, for example, 10,000 of the second antennas 8 are arranged in their width direction in the form of strips with a protective film as a base material, under which condition the second antenna material is wound into a roll. The shape of the second antenna material 14 is not limited to a strip. A plate material such as a copper plate may be sometimes used. In the latter case, as will be explained later, the plate material is cut into pieces of a width dimension similar to the first or second spacer 6 or 7, and eventually manufactured as wireless IC tags.

Numeral 15 denotes a roller provided with a sprocket which engages with, e.g., holes (not shown) made in both ends of the inlet material 11 being fed out by a drive source (not shown) so as to be spaced at equal intervals. Numeral 16 denotes a first feeding roller which compresses the first antenna material 11 and the first spacer material 12, which are fed by a drive source (not shown), and feeds out the compressed material forward (in the direction of the arrow). Numeral 17 denotes a second feeding member which further compresses the plate materials that are compressed and fed by the first feeding roller 16 together with the second spacer material 13 that is fed by a drive source, and feeds out the compressed materials forward (in the direction of the arrow). Numeral 18 denotes a third feeding member which further compresses the plate materials being compressed and fed out by the second feeding member 17 together with the second antenna material 14 being fed out by a not-shown drive source, and feeds out the compressed materials forward (in the direction of the arrow).

Numeral 19 denotes a position detector which generates a signal to control the timing of feeding out the second antenna material 14. The position detector 19 becomes necessary when the second antennas 8 are arranged in parallel in their width direction in the form of strips as shown in FIG. 5. Numeral 20 denotes a position detector which generates a signal to control the timing of cutting the wireless IC tag material being fed out by the third feeding member 18 with use of a cutter 21. Numeral 22 denotes a fixing base which is used as a base when the wireless IC tag material is cut by the cutter 21 and also as a base on which one wireless IC tag shown in FIG. 1 is Steps of manufacturing the wireless IC tag with use of the wireless IC tag manufacturing apparatus will be explained by referring to FIG. 5. First of all, the first spacer material 12 is guided by a drive source, e.g., along a guide rail for restricting its position in a width-direction, and then fed out to the first feeding roller 16. Simultaneously, the first antenna material 11 is guided by the drive source, e.g., along a guide rail for restricting its position in a width-direction, and then fed out until the holes (not shown) made in the both ends of the inlet material engages with the sprocket of the roller 15. The engaged inlet material is then fed out toward the first feeding roller 16. When the first spacer material 12 is fed out, a cover covering the adhesive surface thereof is peeled off from the first spacer material as shown by a dashed line (simultaneously is subjected to anti-static treatment). Thus, after the first antenna material 11 passes the position of the roller 15, the first antenna material 11 is adhered to the adhesive surface of the first spacer material 12. Thereafter, the adhered plate materials are compressed by the first feeding roller 16, and fed out toward the second feeding member 17.

At the point in time when the compressed plate material (having a two-layer structure of the first spacer material 12 and the first antenna material 11) is fed out by the first feeding roller 16, the second spacer material 13 is also guided by the drive source along a guide rail for restricting its position in the width-direction and fed out toward the second feeding member 17. During the above operation, a cover covering one surface of the second spacer material 13 is peeled off as shown by a dashed line (simultaneously is subjected to antistatic treatment), and fed out toward the second feeding member 17. Accordingly, when the plate material being fed out by the first feeding roller 16 reaches the position of the second feeding member 17, the plate material is bonded to one surface of the second spacer material 13 and compressed together, and then fed out toward the third feeding member 18. As explained already above, the other surface of the second spacer material 13 is also an adhesive surface.

When the plate material (having a three-layer structure of the first spacer material 12, the first antenna material 11 and the second spacer material 13) is fed out from the second feeding member 17, the second antenna material 14 is also guided by the drive source, e.g., along a rail guide for restricting its position in a width-direction, and then fed out toward the third feeding member 18. Thus, when the plate material having the three-layer structure being fed out from the second feeding member 17 reaches the position of the third feeding member 18, the plate material is bonded to the other adhesive surface of the second spacer material 13, compressed together, and then fed out toward the cutter 21 as a wireless IC tag material having a four-layer structure.

When the second antenna material 14 is made up of a predetermined number of such second antennas 8 as shown in FIG. 5 arranged in parallel in their width direction in the form of strips, it becomes necessary to control the timing of feeding out the second antenna material 14 in such a manner that, upon the compression of the third feeding member 18, the position of one of the second antennas 8 coincides with the position of one of the first antennas 3 of the first antenna material 11. For this purpose, the position detector 19 generates its timing signal. That is, on the basis of a signal from the position detector 19, the driving of the drive source for feeding out the second antenna material 14 is controlled.

However, when the second antenna material 14 is a plate-shaped material like the first or second spacer material 12 or 13, the second antenna material is required to be cut into strips having the same width when the first spacer 6 and the second spacer 7 are cut. For this reason, controlling the feeding-out timing by the position detector 19 becomes unnecessary, as will be explained later.

When the wireless IC tag material of the four-layer structure is fed out from the third feeding member 18 and reaches the position of the cutter 21, the tag material is sequentially cut into strips having such a width dimension as shown in FIG. 1. In this manner, a wireless IC tag having a structure similar to in FIG. 1 is manufactured. For the above cutting timing, the position detector 20 generates a timing signal as mentioned above. In other words, the cutter 21 is operated on the basis of a signal from the position detector 20. The cutting timing is set at a time point when the position detector 20 detects a marking position indicative of the cutting position previously marked at a width-directional end of the first antenna material 11 (more specifically, the plate-shaped base material 2A). However, the cutting timing is not limited to the above example.

When the second antenna material 14 has a plate shape, the width dimension of the second antenna 8 is not the same as the width of the second antenna 8 shown in FIG. 1, and the second antenna material is cut into strips having a width dimension similar to the first or second spacer 6 or 7.

In the cutting process, if the material having the four-layer structure is cut off into individual wireless IC tag strips, after-treatment of such tags becomes troublesome because the wireless IC tags are randomly oriented on the fixing base 22. For this reason, it is desirable to cut the second antenna material 14, the second spacer material 13, and the first antenna material 11 in the tag material, and to perforate the first spacer material 12 as the lowermost layer. As a result, the manufactured wireless IC tags can be also partially uncut and thus be arranged on the fixing base 22.

Further, when the wireless IC tag material is sequentially cut to manufacture wireless IC tags, the adhesive surfaces are exposed to the cut surfaces thereof. Thus it is necessary to remove the adhesion of the adhesive surface, for example, by sprinkling powder thereover and by removing unnecessary remaining powder or by other suitable means.

In embodiment 2, a wireless IC tag using a first antenna, a first spacer, a second antenna, and a second spacer can be manufactured. Upon manufacturing the wireless IC tag; a plate-shaped first antenna, a plate-shaped first spacer, a plate-shaped second antenna, and a plate-shaped second spacer can be used. As other materials, the followings may be used: a first antenna material, a plate-shaped first spacer material, a plate-shaped second spacer material, a plate-shaped second spacer material, and a plate-shaped second antenna material wherein a predetermined number of second antennas are arranged in their width direction in the form of strips.

Additionally, in embodiment 2, an apparatus for manufacturing a wireless IC tag can be realized with use of the plate-shaped first antenna material, the plate-shaped first spacer material, the plate-shaped second antenna material, and the plate shaped second spacer material. As other materials, the following may be used to realize an apparatus for manufacturing a wireless IC tag; a plate-shaped first antenna material, a plate-shaped first spacer material, a predetermined number of plate-shaped second spacer materials, a second antenna material wherein a predetermined number of plate-shaped second antennas are arranged in their width direction in the form of strips.

Embodiment 3

Figure 10A:
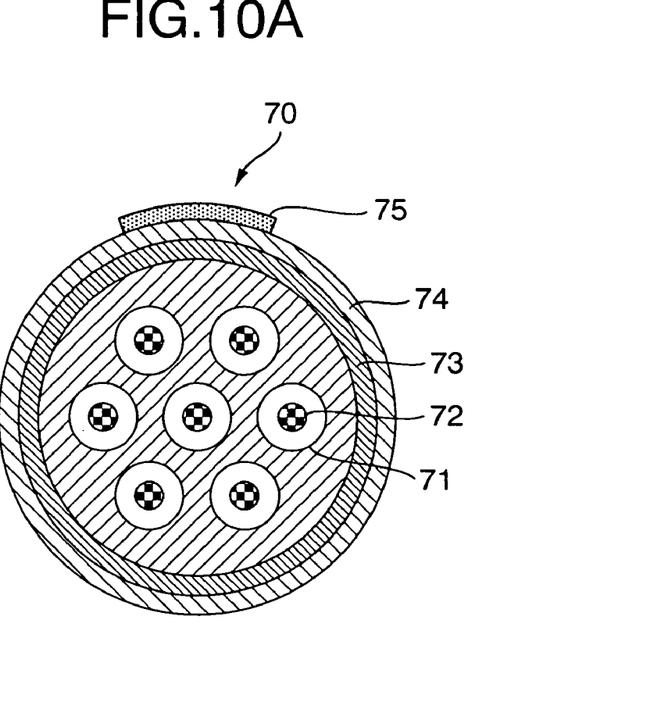
FIG. 10A shows a state of a mounting step when a wireless IC tag is mounted onto a multicore cable in a prior art.
Figure 10B:
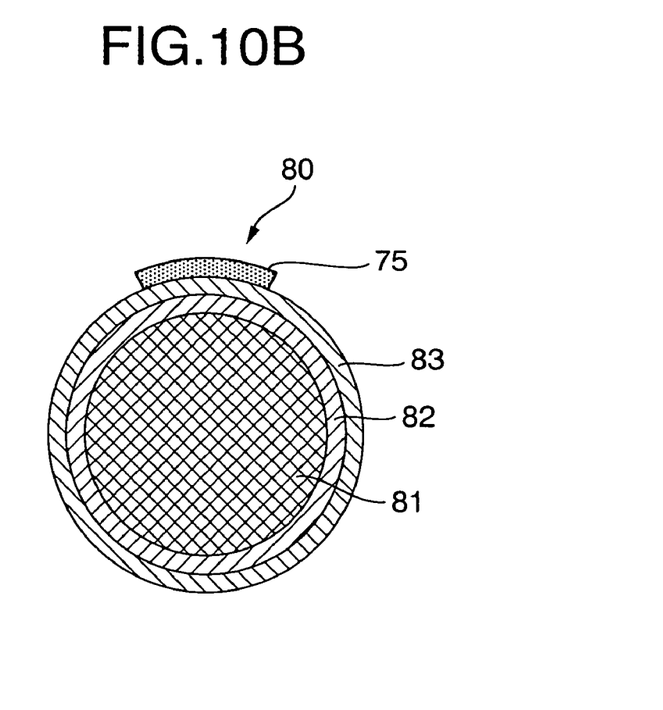
FIG. 10B shows a state of a mounting step when the wireless IC tag is mounted onto a single core cable in the prior art.

Explanation will next be made in connection with an embodiment when a wireless IC tag is mounted to various types of cables including a communication cable and a power cable, by comparing it with a prior art. FIGS. 10A and 10B show a conceptual view of a condition when a wireless IC tag is mounted onto a cable in the prior art, wherein FIG. 10A is a condition when the tag is mounted to a multicore cable, and FIG. 10B is a condition when the tag is mounted onto a single core cable. As shown in FIG. 10A, in a multicore cable 70 used as a communication cable, a plurality of internal conductors 72 as multiple cores each coated with single core envelope 71 are surrounded by a shield layer 73, which in turn is further covered with a cable enclosure 74. A wireless IC tag 75 is bonded onto the surface of the cable enclosure 74 with an adhesive or the like.

As shown in FIG. 10B, in a single core, cable 80 is used as a power cable, an internal conductor 81 is covered with a single core envelope 82, which in turn is coated with a cable enclosure 83. A wireless IC tag 75 is bonded onto the surface of the cable enclosure 83 with an adhesive or the like. Here, the wireless IC tag 75 is generally made of an antenna and an IC chip mounted on a rectangular substrate having a desired small dielectric constant. A plurality of such wireless IC tags 75 are bonded onto the multicore cable 70 or the single core cable 80 along its length direction at intervals of, e.g., 1 m. However, such wireless IC tags 75 tend to be easily peeled off from the cable enclosure 74 (or the cable enclosure 83) because the tags are merely bonded thereon with the adhesive or the like. Further, the communication distance is prevented from being reduced by increasing a spacing between the wireless IC tag 75 and a metallic part (i.e., the shield layer 73 in FIG. 10A or the internal conductor 81 in FIG. 10B) within the cable depending on the thickness of the cable enclosure 74 (or the cable enclosure 83). However, the thickness of the cable enclosure 74 (or the cable enclosure 83) is determined by cable specifications. Thus when the thickness is not sufficient, the communication distance between the wireless IC tag 75 and a reader (not shown) become short. Further, when the multicore cable 70 or the single core cable 80 is molded, the cable enclosure 74 (or the cable enclosure 83) is also heated to a high temperature. Thus, when the wireless IC tag 75 is mounted in the interior of the cable enclosure 74 during its manufacturing steps, the tag is thermally destroyed, disabling mounting of the tag in the cable enclosure. For this reason, a step of bonding the wireless IC tag 75 after completion of the manufacturing steps is required to be added, which leads to making the cable manufacturing cost high.

In the present embodiment, by utilizing the technique explained in the embodiment 1, a glass epoxy substrate or the like having a high heat resistance is used as a tag base material (i.e., a second spacer), an antenna electrode is deposited on the front or back surfaces of the substrate to form a wireless IC tag. During the molding of the cable in the manufacturing steps, the wireless IC tag is buried in the interior of the cable enclosure. As a result, the high temperature during the cable molding which causes deterioration of the tag base material and malfunctioning of the tag is avoided. During handling of the cable, further, the wireless IC tag can be prevented from being peeled off from the cable. In addition, since the antenna electrodes formed on the front and back surface of the tag base material (a second spacer) are used as first and second antennas, it can be avoided that the communication distance of the wireless IC tag be undesirably reduced under the influence of the metallic part (i.e., shield layer or internal conductor) of the cable, as mentioned in connection with the embodiment 1.

Figure 7A:
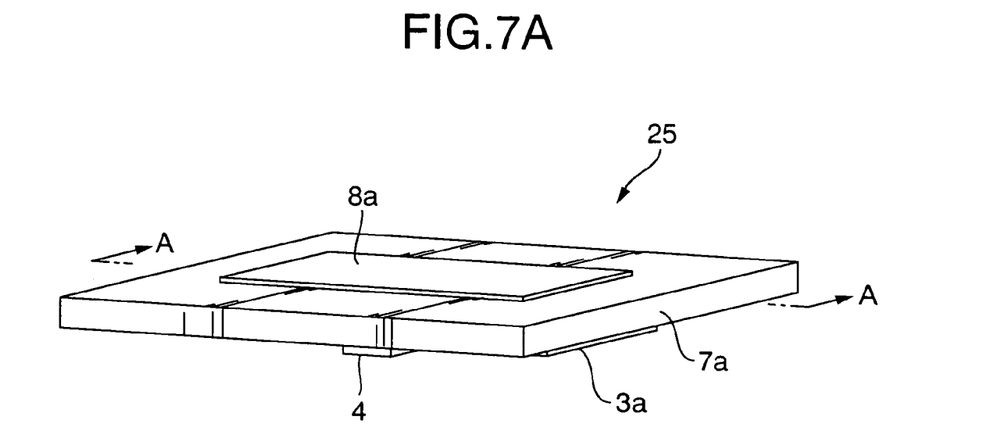
FIG. 7A is a perspective view showing a structure of a wireless IC tag when applied as an embodiment 3.
Figure 7B:
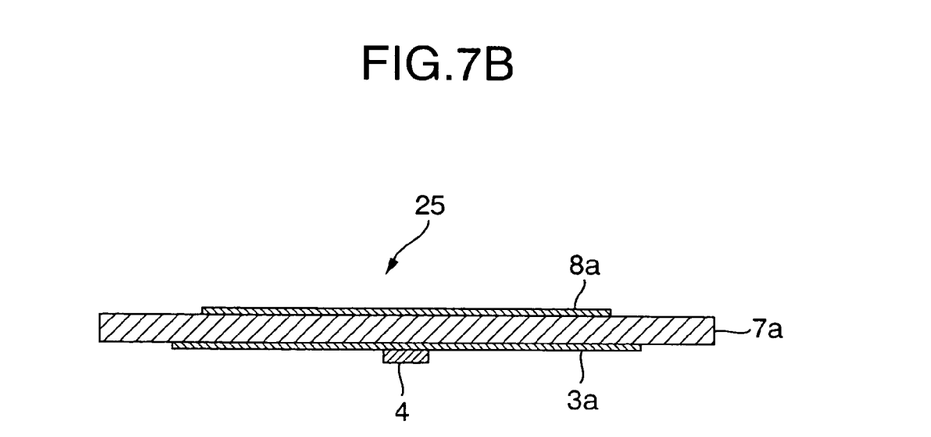
FIG. 7B shows a cross-sectional view of FIG. 7A when taken along line A-A.

FIGS. 7A and 7B show a conceptual view of a wireless IC tag employed in an embodiment 5, wherein FIG. 7A is a perspective view of the tag and FIG. 7B is a cross-sectional view when taken line A-A in FIG. 7A. As shown in FIGS. 7A and 7B, in a wireless IC tag 25, a thin film metallic antenna is deposited on a surface of a heat-resistance second spacer 7a of a glass epoxy material having a desired dielectric constant to form a first antenna 3a. A thin film metallic antenna is deposited on the rear surface of the second spacer 7a at a location opposed to the first antenna 3a to form a second antenna 8a. An IC chip 4 is mounted on the first antenna 3a nearly in the center thereof. The second antenna 8a functions as an auxiliary antenna for resonating to a desired frequency of a radio wave radiated from the first antenna 3a to strengthen the intensity of the radio wave. Accordingly, even when a metallic member is provided in the vicinity of the first antenna 3a, the intensity of the radio wave of the first antenna 3a can be prevented from being made weak thereby, which has already been explained in detail in the foregoing embodiment 1 and thus explanation thereof is omitted herein.

Furthermore, the size, thickness, etc. of the second spacer 7a, the first antenna 3a, and the second antenna 8a have been explained in the foregoing embodiment 1, and therefore explanation thereof is omitted. Since the wireless IC tag 25 thus formed has a small elongated shape, the tag can be easily buried within the cable enclosure along the length direction of the cable during the cable molding operation. Due to the action of the auxiliary antenna of the second antenna 8a, a radio wave can be transmitted from the first antenna 3a without being weakened by the internal conductor (i.e., metal) of the cable. Since the second spacer 7a is made of a glass epoxy material, the spacer can sufficiently withstand a temperature as high as about 200-300° C. during the cable molding. In this connection, the IC chip 4 has a thermal breakdown temperature not lower than 300° C.

Figure 8A:
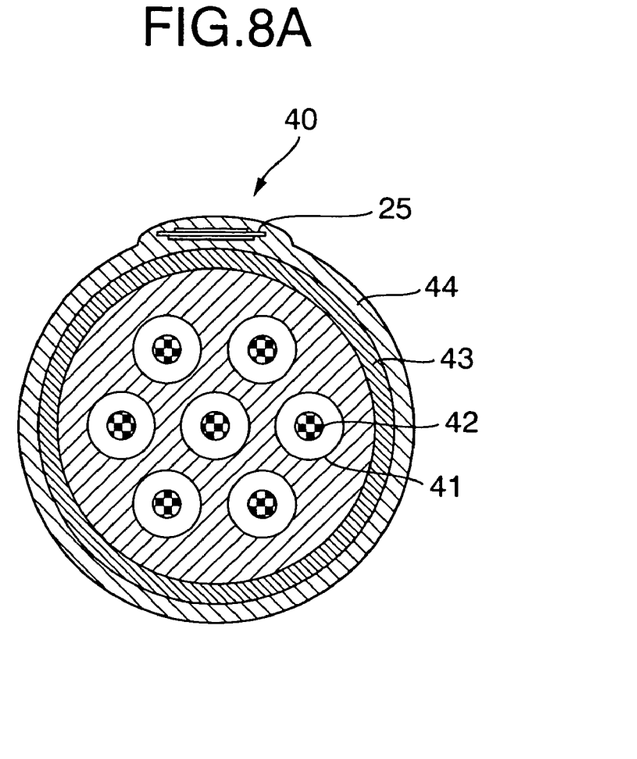
FIG. 8A shows a state of a mounting step when the wireless IC tag is mounted in a multicore cable.
Figure 8B:
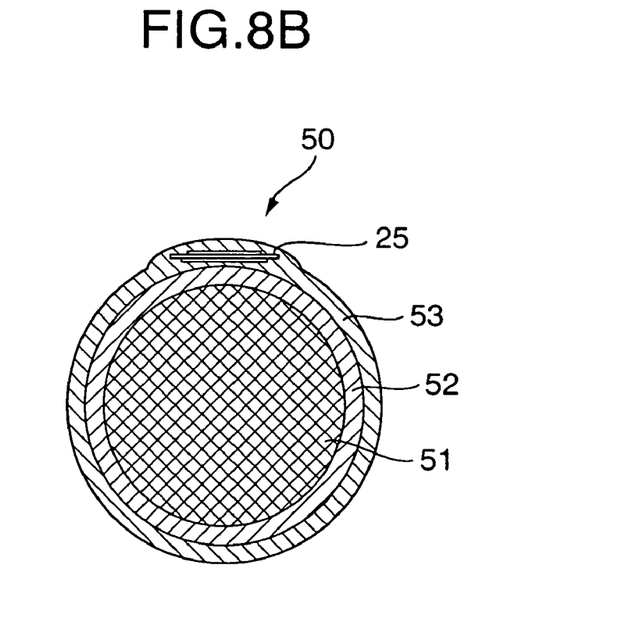
FIG. 8B shows a state of a mounting step when the wireless IC tag is mounted in a single core cable.

FIGS. 8A and 8B show a conceptual view of a situation in which a wireless IC tag is mounted to a cable, wherein FIG. 8A is a condition when the tag is mounted in a multicore cable and FIG. 8B is a condition when the tag is mounted in a power cable. As shown in FIG. 8A, in a multicore cable 40 used as a communication cable, a plurality of internal conductors 42 each covered with a single core envelope 41 are surrounded by a shield layer 43, which in turn is covered with a cable enclosure 44. The wireless IC tag 25 mounted during its molding is buried in the interior of the cable enclosure 44.

As shown in FIG. 8B, in a single core cable 50 used as a power cable, an internal conductor 51 is covered with a single core envelope 52, which in turn is covered with a cable enclosure 53. The wireless IC tag 25 mounted during the molding is buried in the interior of the cable enclosure 53. Such wireless IC tags 25 are buried along the length direction of the multicore cable 40 or the single core cable 50 at intervals of, e.g., 1 m.

As a result, the wireless IC tag 25 can be mounted in the cable enclosure 44 or the cable enclosure 53 without being thermally destroyed, and it can be avoided that the wireless IC tag 25 be peeled off from the multicore cable 40 or the single core cable 50 during cable handling.

In the wireless IC tag 25, in addition, since the first antenna 3a and the second antenna 8a as the auxiliary antenna are formed on the front and back surface of the second spacer as shown in FIGS. 7A and 7B, it can be avoided that radio wave be adversely influenced by the shield layer 43 in the multicore cable 40 or by the metallic layer of the internal conductor 51 in the single core cable 50. Accordingly, the wireless IC tag 25 can secure a sufficient communication distance. The provision of the first and second antennas 3a and 8a enables prevention of reduction of the communication distance caused by the metallic layer, which has already been explained in embodiment 1 and explanation thereof is omitted.

When such a wireless IC tag 25 as shown in FIGS. 7A and 7B is buried in the interior of the cable enclosure 44 (or the cable enclosure 53) as shown in FIGS. 8A and 8B, the cable enclosure 44 (or the cable enclosure 53) is used as a first spacer. Therefore, the cable enclosure 44 (or the cable enclosure 53) is required to be controlled to have a desired thickness.

Next explanation will be made as to a method for manufacturing a wireless IC tag to be buried in the cable enclosure. FIGS. 9A to 9D show steps of manufacturing a wireless IC tag to be buried in a cable enclosure in the present embodiment. In a first step of FIG. 9A, aluminum, copper or similar substance is deposited at equal pitch intervals on the surface of a glass epoxy substrate 61 to form a plurality of first antennas 3a as thin films. Though not illustrated, aluminum, copper or similar substance is deposited on the rear surface of the glass epoxy substrate 61 at positions opposed to the first antennas 3a to form a multiplicity of second antennas 8a. In this connection, the first antennas 3a and the second antennas 8a may be formed as thin films on the front and back surface of the glass epoxy substrate 61 by an etching process.

Figure 9A:
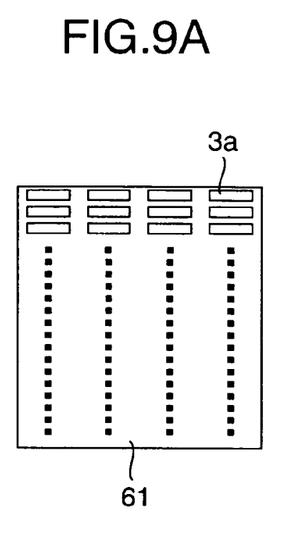
FIG. 9A shows one of steps of manufacturing the wireless IC tag to be buried in an outer layer or enclosure of a cable in the present invention.
Figure 9B:
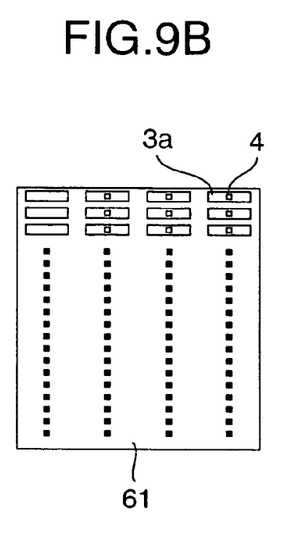
FIG. 9B shows one of steps of manufacturing the wireless IC tag to be buried in the enclosure of the cable in the present invention.
Figure 9C:
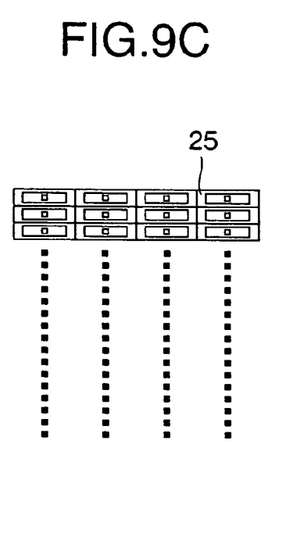
FIG. 9C shows one of steps of manufacturing the wireless IC tag to be buried in the enclosure of the cable in the present invention.

In a second step of FIG. 9B, next, an IC chip 4 is mounted nearly in the center of each of the multiplicity of first antennas 3a, and terminals of the IC chips 4 are connected to the respective first antennas 3a. In a third step of FIG. 9C, the substrate is cut along cutout lines previously made in the glass epoxy substrate 61 into a multiplicity of individual wireless IC tags. As a result, a wireless IC tag 25 can be manufactured such that the first antenna 3a and the IC chip 4 are positioned on one surface of the second spacer 7a of a glass epoxy substrate and the second antenna 8a, is positioned on the other surface thereof as shown in FIGS. 7A and 7B.

Figure 9D:
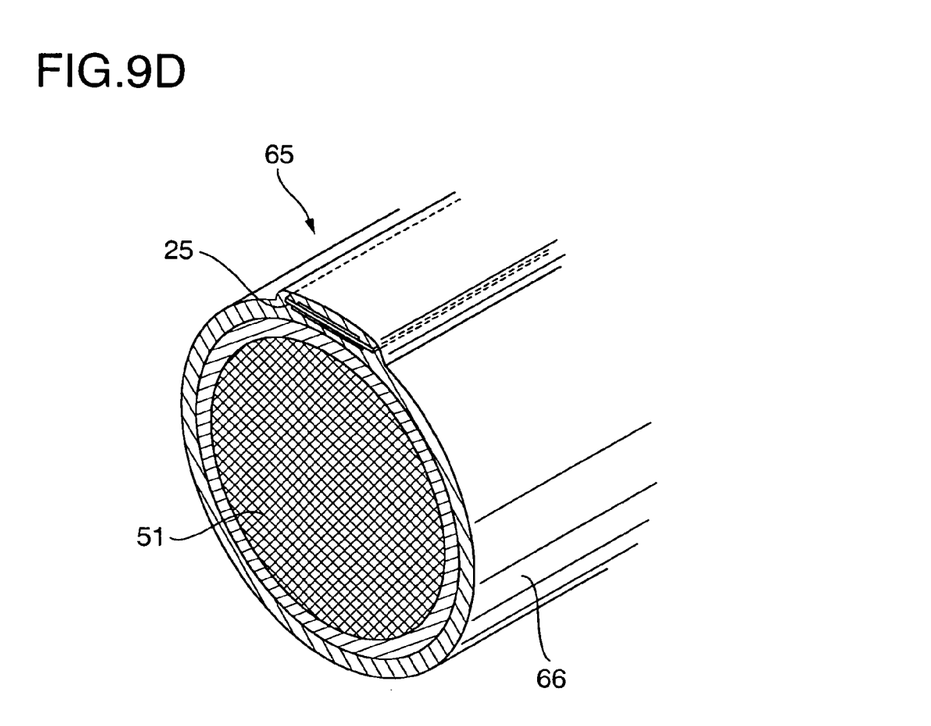
FIG. 9D shows one of steps of manufacturing the wireless IC tag to be buried in the enclosure of the cable in the present invention.

In a fourth step of FIG. 9D, next, a single wireless IC tag 25 is buried in the interior of a cable enclosure 66 at a predetermined position during cable molding in steps of manufacturing a cable 65 (single core cable). At this time, such wireless IC tags 25 are buried in the cable enclosure 66, for example, along the length direction of the cable 65 at interval of 1 m and simultaneously molded. In this case, if the thickness of the cable enclosure 66 is not sufficient, as shown in FIG. 9D, a part of the cable enclosure where the wireless IC tag 25 is to be mounted is raised, the tag 25 is buried in the raised part to be spaced by a predetermined distance from the internal conductor 51. The temperature, when butyl rubber or the like to be formed as the cable enclosure 66 is molded, is increased up to some 200-300° C., but the wireless IC tag 25 using the glass epoxy substrate will not be thermally destroyed by the molding temperature. When the wireless IC tag 25 is buried in the cable enclosure 66 in this manner, the wireless IC tag 25 can be prevented from coming off from the cable 65, can secure a desired communication distance, and can be prevented from being thermally destroyed during the cable molding. That is, since the wireless IC tag can withstand such a high temperature during the cable molding, the tag can be mounted in the cable enclosure. Whereby the wireless IC tag can be avoided from coming off from the cable, and its communication distance can be made long.

Although several of the embodiments have been explained, the present invention is not limited to the above examples but the invention can be implemented in the form of another embodiment. In the above respective embodiments, in particular, explanation has been made in connection with the arrangements where the second spacer and the second antenna are laminated on the conventional inlet, and the first and second antennas are provided on the both sides of the substrate as the second spacer. However, the wireless IC tag can have a multi-layered structure of spacers and antennas, as by further laminating a third spacer and a third antenna on the second antenna and laminating a fourth spacer and a fourth antenna on the third antenna, and so on.

The frequency of radio wave is also not limited to 2.45 GHz mentioned above but the invention can be realized in another frequency.

Though glass epoxy has been employed as the material of the second spacer in the wireless IC tag to be buried in the cable enclosure, the invention is not limited to the example. It goes without saying that the present invention can be realized, for example, even when a heat resistance substrate made of ceramic or fluorine resin (e.g., TEFLON®) is used as the second spacer.

It should be further understood by those skilled in the art that although the foregoing description has been made with respect to embodiments of the invention, the invention is not limited thereto and various changes and modifications may be made without departing from the spirit of the invention and the scope of the appended claims.

The invention claimed is:

1. A wireless IC tag comprising:
    an IC chip having identification information stored therein;
    a first antenna having a predetermined length and connected to said IC chip, wherein said IC chip transmits said identification information with use of an operating power generated from a radio wave having a predetermined frequency received via said first antenna;
    a first spacer provided between a member and said first antenna for maintaining a distance therebetween, said first spacer being mounted on said member;
    a second antenna having a predetermined length for resonating to said radio wave of said predetermined frequency; and
    a second spacer provided between said first antenna and said second antenna for maintaining a distance between both antennas,
    wherein said first antenna and said second antenna are flat antennas insulated from each other by said second spacer, and are disposed in parallel to each other on opposite surfaces of said second spacer.

2. The wireless IC tag according to claim 1, wherein said first spacer and said second spacer are made of an insulating material, and a thickness of said second spacer is larger than a thickness of said first spacer.

3. The wireless IC tag according to claim 2, wherein said first spacer and said first antenna, said first antenna and said second spacer, and said second antenna and said second antenna are respectively joined with an adhesive.

4. The wireless IC tag according to claim 1, wherein said first spacer and said first antenna, said first antenna and said second spacer, and said second spacer and said second antenna are respectively joined with an adhesive.

5. A method for manufacturing a wireless IC tag comprising the steps of:
    mounting a first spacer on one surface of a first antenna, which transmits identification information stored in an IC chip;
    mounting a second spacer on another surface of said first antenna, said another surface being opposite to said one surface; and
    mounting a second antenna, for resonating to a radio wave having a predetermined frequency together with said first antenna, on a surface of said second spacer opposite to a surface on which said first antenna is mounted,
    wherein said first antenna and said second antenna are flat antennas insulated from each other by said second spacer, and are disposed in parallel to each other on opposite surfaces of said second spacer.

6. The method according to claim 5, wherein said first and second spacers are plate shaped.

7. A method for manufacturing a wireless IC tag, comprising the steps of:
- mounting a first spacer material on one surface of a first antenna material on which a predetermined number of first antennas connected to IC chips having identification information stored therein are arranged on a base material;
- conveying said first spacer material and said first antenna material forward;
- mounting a second spacer material on the another surface of said first antenna material, said another surface being opposite to said one surface;
- conveying said first spacer materials, and said second spacer material and said first antenna material forward;
- mounting a second antenna material on a surface of said second spacer material opposite to a surface on which said first antenna material is mounted, thereby forming a wireless IC tag material;
- conveying said wireless IC tag material forward; and
- sequentially cutting said wireless IC tag material to form wireless IC tags,
- wherein said first antenna material and said second antenna material are flat antennas insulated from each other by said second spacer material, and are disposed in parallel to each other on opposite surfaces of said second spacer material.

8. The method according to claim 7, wherein said first and second spacer materials are plate shaped.

9. The method according to claim 7, wherein said base material is plate shaped.

10. A method for manufacturing a wireless IC tag, comprising the steps of:
- mounting a first spacer material on one surface of a first antenna material on which a predetermined number of first antennas connected to IC chips having identification information stored therein are arranged in a width-wise direction in the form of strips on a base material;
- conveying said first spacer material and said first antenna material forward;
- mounting a second spacer material on the another surface of said first antenna material, said another surface being opposite to said one surface;
- conveying said first spacer material, said second spacer material and said first antenna material forward;
- mounting a second antenna material, on which a predetermined number of second antennas are arranged, on a surface of said second spacer material opposite to a surface on which said first antenna material mounted thereon in such a manner that a width-wise direction of said first antennas coincides with the width-wise direction of said second antennas, thereby forming a wireless IC tag material;
- conveying said wireless IC tag material forward; and
- sequentially cutting said wireless IC tag material to form wireless IC tags,
- wherein said first antenna material and said second antenna material are flat antennas insulated from each other by said second spacer material, and are disposed in parallel to each other on opposite surfaces of said second spacer material.

11. The method according to claim 10, wherein said first and second spacer materials are plate shaped.

12. The method according to claim 10, wherein said base material is plate shaped.

13. An apparatus for manufacturing a wireless IC tag, comprising:
- a first feeder for mounting a plate-shaped first spacer material on one surface of a first antenna material on which a predetermined number of first antennas connected to IC chips having identification information stored therein are arranged on a plate shaped base material in a width-wise direction in the form of strips, and for feeding out said first spacer material and said first antenna material forward;
- a second feeder for mounting a plate-shaped second spacer material another surface, opposite to said one surface, of said first antenna material, and for feeding out the first spacer material, said second spacer material and said first antenna material forward;
- a third feeder for mounting a second antenna material on a surface of said second spacer material opposite a surface on which said first antenna material is mounted, thereby forming a wireless IC tag material, and for feeding out the wireless IC tag material; and
- a cutter for sequentially cutting said wireless IC tag material to form wireless IC tags,
- wherein said first antenna material and said second antenna material are flat antennas insulated from each other by said second spacer material, and are disposed in parallel to each other on opposite surfaces of said second spacer material.

14. An apparatus for manufacturing a wireless IC tag, comprising:
- a first feeder for mounting a plate-shaped first spacer material on one surface of a first antenna material on which a predetermined number of first antennas connected to IC chips having identification information stored therein are arranged on a plate shaped base material in width-wise direction in the form of strips, and for feeding out the first spacer material and said first antenna material forward;
- a second feeder for mounting a plate-shaped second spacer material on another surface, opposite to said one surface, of said first antenna material, and for feeding out the first spacer material, said second spacer material and said first antenna material forward;
- a third feeder for mounting said plate-shaped second antenna material, on which a predetermined number of second antennas are arranged in a width-wise direction in the form of strips, on a surface of said second spacer material opposite to a surface on which said first antenna material is mounted in such a manner that the width-wise direction position of said first antennas coincides with the width-wise direction position of said second antenna, thereby forming a wireless IC tag, and for feeding out the wireless IC tag; and
- a cutter for sequentially cutting said wireless IC tag material to form wireless IC tags,
- wherein said first antenna material and said second antenna material are flat antennas insulated from each other by said second spacer material, and are disposed in parallel to each other on opposite surfaces of said second spacer material.

15. A wireless IC tag comprising:
- an IC chip having identification information stored therein;
- a first antenna for wirelessly transmitting the identification information recorded in the IC chip;
- a substrate made of a heat-resistant insulating material wherein the first antenna is formed on one surface of said substrate and has said IC chip mounted thereon for transmitting the identification information recorded in the IC chip; and a second antenna formed on another surface, opposite to said one surface, of said substrate and for resonating to a radio wave having a predetermined frequency together with said first antenna, wherein said first antenna and said second antenna are flat antennas insulated from each other by said second spacer, and are disposed in parallel to each other on opposite surfaces of said second spacer.

16. The wireless IC tag according to claim 15, wherein said substrate includes a material selected from a group consisting of glass epoxy, ceramic, and fluorine resin.

17. A wireless IC tag for burial in an insulating enclosure of a cable so as to wirelessly transmit identification information recorded in an IC chip, said insulating enclosure functioning as a first spacer, said IC tag comprising:

a second spacer made of a heat-resistant insulating material;

a first antenna formed on one surface of said second spacer and having said IC chip mounted thereon for transmitting the identification information recorded in the IC chip; and a second antenna formed on another surface, opposite said one surface, of said second spacer for resonating to a radio wave having a predetermined frequency at said first antenna, wherein said insulating enclosure functioning as a first spacer maintains a distance between said first antenna and an internal conductor or a shield layer in an interior portion of said cable, and wherein said first antenna and said second antenna are flat antennas insulated from each other by said second spacer, and are disposed in parallel to each other on opposite surfaces of said second spacer.

18. A method for manufacturing a wireless IC tag for burial in an insulating enclosure of a cable for wirelessly transmitting identification information recorded in IC chips, said insulating enclosure functioning as a first spacer, said method comprising the steps of:

forming a plurality of first antennas on a first surface of a glass epoxy substrate at equal pitch intervals;

forming a plurality of second antennas on a second surface of said glass epoxy substrate at respective positions opposing said first antennas;

individually mounting the IC chips on the plurality of first antennas respectively;

cutting said glass epoxy substrate into separate wireless IC tags such that each IC tag includes one of said first antennas on said first surface having one of said IC chips mounted thereon and includes one of said second antennas on said second surface; and burying said wireless IC tag in said insulating enclosure during molding of said cable during manufacture of the cable, wherein said plurality of first antennas and said plurality of second antennas are flat antennas, said first antennas being insulated from said second antennas by said glass epoxy substrate, and wherein said first antennas are disposed in parallel to said second antennas and are on opposite surfaces of said glass epoxy substrate.

19. A wireless IC tag comprising:

an IC chip having identification information stored therein;

a first antenna having a predetermined length and connected to said IC chip;

a first spacer provided between a member and said first antenna for maintaining a distance therebetween, said IC chip being mounted on said member;

a second antenna having a predetermined length for resonating to a radio wave having a predetermined frequency; and a second spacer provided between said first antenna and said second antenna for maintaining a distance between both antennas, wherein said first antenna and said second antenna are flat antennas insulated from each other by said second spacer, and are disposed in parallel to each other on opposite surfaces of said second spacer.

20. The wireless IC tag according to claim 19, wherein said first spacer and said second spacer are made of an insulating material and a thickness of said second antenna is larger than a thickness of said first spacer.

21. The wireless IC tag according to claim 19, wherein said first spacer and said first antenna, said first antenna and said second spacer, and said second spacer and said second antenna are joined, respectively.

* * * * *